(12) United States Patent
Maeda et al.

(10) Patent No.: US 8,020,489 B2
(45) Date of Patent: Sep. 20, 2011

(54) SQUIB AND GAS GENERATOR

(75) Inventors: Shigeru Maeda, Himeji (JP); Hirotaka Mukunoki, Himeji (JP); Hideyuki Koike, Himeji (JP)

(73) Assignee: Nipponkayaku Kabushikikaisha, Tokyo (JP)

( * ) Notice: Subject to any disclaimer, the term of this patent is extended or adjusted under 35 U.S.C. 154(b) by 213 days.

(21) Appl. No.: 12/447,071

(22) PCT Filed: Oct. 26, 2007

(86) PCT No.: PCT/JP2007/070914
§ 371 (c)(1),
(2), (4) Date: Apr. 24, 2009

(87) PCT Pub. No.: WO2008/050861
PCT Pub. Date: May 2, 2008

(65) Prior Publication Data
US 2010/0013202 A1    Jan. 21, 2010

(30) Foreign Application Priority Data

Oct. 26, 2006  (JP) .................................. 2006-291295

(51) Int. Cl.
*F42C 11/00* (2006.01)
*F42C 19/00* (2006.01)
*F42B 3/103* (2006.01)
*B60R 21/16* (2006.01)

(52) U.S. Cl. .............. 102/202.11; 102/202.5; 102/202.7; 280/728.1

(58) Field of Classification Search ................ 102/202.5, 102/202.7, 202.9, 202.11, 202.12, 202.14; 280/728.1
See application file for complete search history.

(56) References Cited

U.S. PATENT DOCUMENTS

| 3,208,380 | A | * | 9/1965 | Scherrer | 102/202.7 |
| 3,277,824 | A | * | 10/1966 | Bankston | 313/53 |
| 3,344,744 | A | * | 10/1967 | Bankston, Jr. | 102/202.1 |

(Continued)

FOREIGN PATENT DOCUMENTS

JP     2000-108838     4/2000

(Continued)

OTHER PUBLICATIONS

International Search Report, PCT/JP2007/070914, dated Nov. 20, 2007.

(Continued)

*Primary Examiner* — Bret Hayes
(74) *Attorney, Agent, or Firm* — David J. Aston; Peters Verny, LLP (57) ABSTRACT

A squib includes an SCB chip connected to electrode pins so as to ignite by externally applied electric current, and a capacitor electrically connected to the electrode pins in parallel with a thin film resistor on the SCB chip. The capacitor is arranged above the header, and the SCB chip is directly mounted on the capacitor so that the thin film resistor on the SCB chip and the capacitor are electrically connected through electrodes provided on a substrate of the SCB chip, while the size of the SCB chip is smaller than that of the capacitor. In this way, the invention provides the squib which effectively eliminates surface unevenness when the capacitor is located, and enables the connection of the SCB chip and the capacitor to the electrode pins only by one reflow process, and further makes it possible to use an even smaller chip than those used in the prior art.

15 Claims, 9 Drawing Sheets

U.S. PATENT DOCUMENTS

| | | | | |
|---|---|---|---|---|
| 4,616,565 A | * | 10/1986 | Reinovsky | 102/202.7 |
| 4,843,964 A | * | 7/1989 | Bickes et al. | 102/202.5 |
| 4,893,563 A | * | 1/1990 | Baginski | 102/202.2 |
| 5,094,166 A | * | 3/1992 | Hendley, Jr. | 102/202.7 |
| H1366 H | * | 11/1994 | Bickes et al. | 102/202.5 |
| 5,503,077 A | * | 4/1996 | Motley | 102/202.5 |
| 5,544,585 A | | 8/1996 | Duguet | |
| 5,861,570 A | | 1/1999 | Bickes et al. | |
| 5,912,427 A | | 6/1999 | Willis et al. | |
| 6,054,760 A | * | 4/2000 | Martinez-Tovar et al. | 257/692 |
| 6,732,656 B1 | * | 5/2004 | Heyse et al. | 102/202.1 |
| 7,021,218 B2 | * | 4/2006 | Davis | 102/218 |
| 2005/0178282 A1 | * | 8/2005 | Brooks et al. | 102/202.7 |
| 2006/0081146 A1 | | 4/2006 | Baginski et al. | |

FOREIGN PATENT DOCUMENTS

| | | |
|---|---|---|
| JP | 2000-241098 | 9/2000 |
| JP | 2003-205823 | 7/2003 |
| WO | 98/28792 A1 | 7/1998 |
| WO | 00/43727 A2 | 7/2000 |

OTHER PUBLICATIONS

International Search Report PCT/JP2007/070910.

* cited by examiner

Fig. 1A

Prior Art

Fig. 1B

Prior Art

SQUIB AND GAS GENERATOR

CROSS-REFERENCE TO RELATED APPLICATIONS

This application claims priority from PCT application PCT/JP2007/070914, filed on Oct. 26, 2007, which is hereby incorporated by reference in its entirety, and thisapplication further claims priority to Japanese Patent Application No. 2006-291295 filed on Oct. 26, 2006.

TECHNICAL FIELD

This invention relates to a squib to be installed in a gas generator or the like used in a safety device for a car such as an air bag and the like.

More particularly, this invention relates to a gas generator with such a squib installed therein for an air bag, and a gas generator with the squib for a seat belt pretensioner.

BACKGROUND ART

A variety of electric squibs have been developed as squibs for gas generators for inflating air bags equipped in cars.

Such a squib usually has metal pins for electrically connecting to the external, and a heating element at the other ends of the metal pins for igniting an explosive.

Hitherto used ignition devices have used bridging wires for igniting explosive, and nichrome wires have been used as bridging wires. If wire diameters are too fine, the bridging wires could not be attached. However, when using bridging wires of diameters enabling the wires to be attached, the wires of such diameters generally have a large heat capacity so that the time period becomes longer from turning on electricity to the moment at which the bridging wires reach the ignition temperature of the explosive, with the result that, for example, the quick responsibility required for side inflators for cars is not sufficient.

In order to obtain another ignition device, moreover, a method has been known for forming a thick film resistor directly on a printed circuit board using the technique for producing the printed circuit board.

For example, Patent Document 1 disclosed a squib using a printed circuit board on which a thick film resistor is directly formed, and a varistor is mounted on another part on the printed circuit board for the purpose of electrostatic protection. Moreover, Patent Document 2 likewise disclosed a squib obtained by production steps of mounting a resistive heating element on a printed circuit board, connecting a capacitor and a varistor to the printed circuit board by soldering, and further connecting the product thus obtained to electrode pins.

Although these techniques have improved the quick responsibility from the level of those using bridging wires, the responsibility has remained insufficient.

Patent Document 1: Official Gazette of Japanese Patent Application Laid Open No. 2003-205,823
Patent Document 2: Official Gazette of Japanese Patent Application Laid Open No. 2000-108,838

On the other hand, the semiconductor bridge (SCB) is a generic name of bridges produced using the semiconductor technique such as sputtering, vapor deposition, or the like. Ignition devices using semiconductor bridges are of a very fine structure having fine line widths in comparison with those using bridging wires or printed circuit boards. Further, the ignition devices using semiconductor bridges utilize thin film bridges whose film thicknesses are of the order of a few microns so that it is possible to make their heat capacity smaller so as to have quick responsibility. While the bridging wires require time period of 800 to 1,000 microseconds for heating ignition powder to its ignition temperature with electric current of 1.2 A, the semiconductor bridges generally enable ignition powder to be ignited only requiring time period of the order of 100 to 200 microseconds. With the SCB, since semiconductor production equipment such as for sputtering and vapor deposition may be used, it is possible to make the board remarkably smaller and further possible to make the heat capacity of heating part smaller and to accurately control the heat capacity, thereby stably producing squibs higher in ignition responsibility.

Following methods for installing such an SCB in the squib have been known. The SCB is directly mounted on a header, and end electrodes are connected to electrode pins by wire bonding. Or, as disclosed in Patent Document 3, similarly to the printed circuit board, once the SCB is mounted on a printed circuit board, and after the printed circuit board has been mounted on a header, electrode pins and predetermined electrodes of the printed circuit board are connected by soldering.

Patent Document 3: Official Gazette of Japanese Patent Application Laid Open No. 2002-13,900.

When using such a semiconductor bridge having a smaller heat capacity, however, there is a risk of the squib erroneously igniting due to noise such as external static electricity.

Consequently, known in the art is arranging a capacitor in parallel with the semiconductor bridge for absorbing discharged static electricity in order to prevent the erroneous ignition due to the static electricity.

Figure 1A:
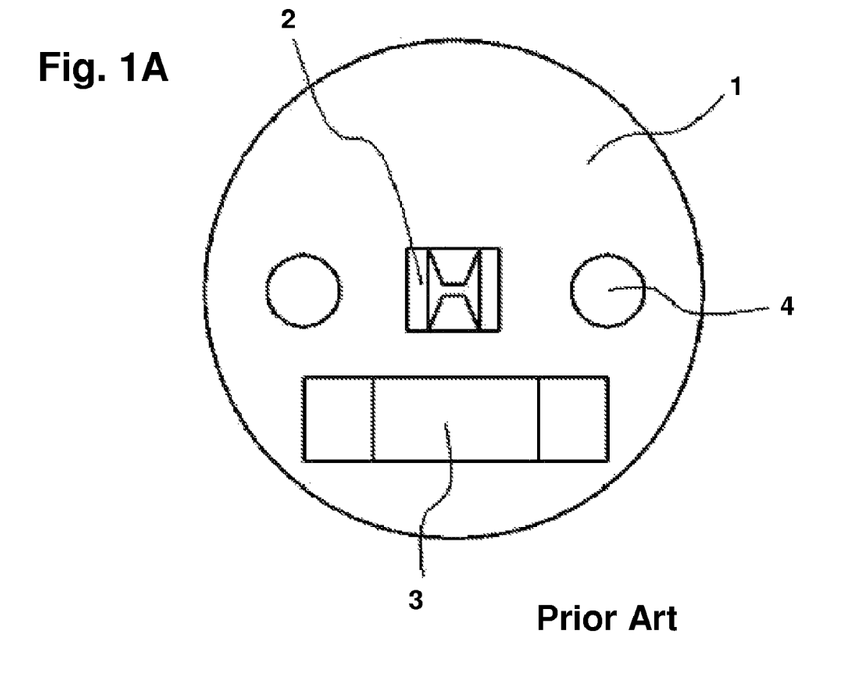
FIG. 1 is a plan view (a) and a sectional view (b) of a general squib of the prior art.
Figure 1B:
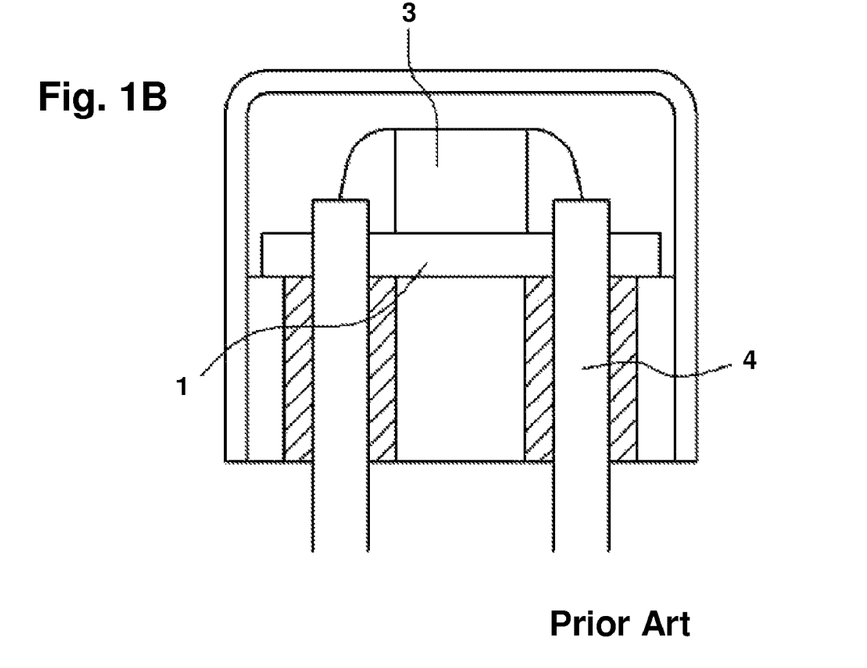

A plan view of FIG. 1 (*a*) and a sectional view of FIG. 1 (*b*) illustrate a typical example of the squib of the type that a heating resistive element is directly formed on a printed circuit board as a base for igniting, or an SCB is mounted on a board and an electrostatic protection device is provided at another location of the board.

As shown in these drawings, according to the hitherto used method, generally, a printed circuit board 1 is formed with through-holes, and electrode pins are brought into direct contact with the printed circuit board 1 and connected thereto by soldering or the like. Nickel chrome alloy is frequently used as a thick film resistor 2. In order to connect an electrostatic protection device 3, for example, varistor, capacitor, or diode as electrostatic protection means in parallel with the thick film resistor 2, electrodes are provided on the printed circuit board 1 at the location at which the electrostatic protection device 3 is to be mounted, and the electrostatic protection device 3 is fixed thereto by soldering in the same manner as general circuits. In this method, although the electrode pins 4 can be readily connected to the thick film resistor 2 and the electrostatic protection device 3, the miniaturization of squibs has been limited, since the printed circuit board 1 itself is connected to the electrode pins 4.

DISCLOSURE OF THE INVENTION

Task to Be Solved by the Invention

With the circuit board, that is, the so-called circuit board having the thick film resistor as described above, the circuit board has a size larger than the distance between the electrode pins for the purpose of directly connecting the circuit board to the electrode pins. In the case of combining with the electrostatic protection device, particularly, the thick film resistor is formed on the circuit board which is larger than the electrostatic protection device, and the electrostatic protection device is connected to the circuit board as a base, while the circuit board itself is also in contact with and connected to the electrode pins.

With this construction, however, the thick film resistor must be formed directly on the circuit board which is larger than the distance between the electrode pins or the size of the electrostatic protection device. Such circuit boards are usually produced and used in a manner that a plurality of the same circuit boards are formed on a large base board and then divided into individual circuit boards. Therefore, if one circuit board for the thick film resistor is large, the number of circuit boards each having a thick film resistor obtained from one base board is necessarily limited so that the improvement in productivity would have a limitation. Consequently, there has been an increasing demand for a newly developed production technique enabling boards each having a thick film resistor to be produced as many as possible from one base board.

Moreover, as the electrostatic protection device is generally mounted on each of circuit boards before the base board is divided into individual circuit boards, the electrostatic protection devices would be subjected to stresses when the base board is being divided so that there would be a risk of the electrostatic protection devices themselves being damaged or destroyed by the stresses. On the other hand, a smaller SCB chip is more advantageous for productivity. However, connection of the smaller SCB chip to electrode pins by soldering becomes more difficult. In the case of combining with the capacitor, further, the method of separately mounting an SCB chip and a capacitor on a circuit board has been used, as clarified in the prior art described above, because the SCB chip is smaller than the capacitor.

Different from the case of directly forming a resistor on a board, however, as the number of parts increases because the SCB chip and the board are separate parts, the miniaturization becomes difficult and for the same reason connected locations increase, resulting in decreased reliability from the standpoint of guarantee of quality.

With the connection configuration described above, moreover, since the height of the capacitor is higher than that of the SCB chip, the surface of the board becomes uneven so that irregularities in density of ignition powder occur when the resister is assembled with a cup body with ignition powder packed therein. These problems remain to be solved.

The present invention effectively solves the problems described above, and has an object to provide a squib which enables its miniaturization and improvement in quality with high productivity and at the same time to provide a gas generator for an air bag having the squib described above installed therein, and a gas generator for a seat belt pretensioner having the squib described above installed therein.

Solution for the Task

By the way, the inventors of the present application have earnestly investigated to solve the problems described above and have obtained the following recognitions.
(1) Without individually mounting the SCB chip and the capacitor on the board, an SCB chip whose size is smaller than the size (plane area) of the capacitor is directly mounted on the capacitor, and under this condition the SCB chip and end electrodes of the capacitor are connected by solder or conductive paste, thereby obtaining a very small SCB component with an electrostatic protection device. In this way, when this component is mounted on a header, it is possible to provide a squib which is more compact than that having a board directly connected to electrode pins of the prior art.
(2) With the connection configuration described above, capacitor electrodes can be directly connected to electrode pins by solder or conductive paste so that the SCB chip is connected to the electrode pins through capacitor electrodes. Therefore, there is no need to directly connect the electrodes of the SCB chip to between the electrode pins so that it becomes possible to use smaller SCB chips which have been difficult to be used.
(3) With the connection described above, by employing steps of mounting the SCB chip on the capacitor, connecting the SCB chip under this condition to the capacitor electrodes by solder or conductive paste, and then connecting the capacitor electrodes to the electrode pins likewise by solder or conductive paste (inverse step order being possible), the connection of the three parts can be effected only by one reflow process.
(4) In order to connect the SCB chip to the capacitor, it is necessary to make it possible to connect at the bottom surface or side surfaces of the chip. For this purpose, by using as a base substrate, a substrate having electrodes on its upper and side surfaces, or a substrate having electrodes on its upper and bottom surfaces, or a substrate having electrodes on its upper, side and bottom surfaces, a thin film resistor is formed on the substrate, whereby end electrodes of the thin film resistor can be electrically connected to the capacitor through these side or bottom electrodes by solder or conductive paste.
(5) With the connection configuration as described above, the unevenness of surface due to the thickness of the capacitor come into question likewise. To solve this problem, however, the region of the header on which the capacitor with the SCB chip is mounted is formed with a recess having a depth corresponding to the thickness of the SCB chip and the capacitor so that the level of the region accommodated the SCB chip and the capacitor becomes substantially the same as the level of the area around the region.
(6) In the case that the SCB chip is integrated with the capacitor and they are mounted on the header, it is also possible to connect the SCB chip and the electrode pins by means of wire bonding. By employing such a connection configuration, higher reliability than soldering can be obtained.

Namely, the subject features of the invention are as follows.
(1) A squib including a cup body and a header for holding a plurality of electrode pins insulated from one another and closing the opening of said cup body, and further including, in said cup body, ignition powder and an SCB chip connected to said electrode pins for igniting said ignition powder by externally applying electric current, said SCB chip consisting of a substrate and a thin film resistor formed on its upper surface, and a capacitor electrically connected to said electrode pins in parallel with the thin film resistor of said SCB chip, characterized in that said capacitor is arranged above said header, and said SCB chip is directly mounted on said capacitor so that the thin film resistor on said SCB chip and said capacitor are electrically connected through electrodes provided on the substrate of said SCB chip, and that the size of said SCB chip is smaller than that of the capacitor.
(2) In the (1) described above, the squib characterized in that electrically connecting means for connecting said SCB chip and said capacitor is solder or conductive paste.
(3) In the (2) described above, the squib characterized in that the upper and side surfaces and/or bottom surface of the substrate of said SCB chip is provided with top and side electrodes and/or bottom electrodes, and the electrical connection of said SCB chip and said capacitor is via said side electrodes and/or said bottom electrodes.

(4) In the (3) described above, the squib characterized in that said side electrodes are side through-hole electrodes.

(5) In the (3) described above, the squib characterized in that said top electrodes and said bottom electrodes are connected by through-electrodes provided in said substrate.

(6) In any one of the (1) to (5) described above, the squib characterized in that said SCB chip and said electrode pins are electrically connected through capacitor electrodes connected to said SCB chip and indirectly through solder or conductive paste.

(7) In any one of the (1) to (5) described above, the squib characterized in that said SCB chip and said electrode pins are electrically connected directly through wire bonding connected to end electrodes of said thin film resistor.

(8) In any one of the (1) to (7) described above, the squib characterized in that said header is formed with a recess of a depth corresponding to the thickness of said capacitor with said SCB chip at a region of said header onto which said capacitor with said SCB chip is mounted so that the height of said SCB chip is equalized with the height of the header around said capacitor with said SCB chip except for the region on which said capacitor with said SCB chip is mounted.

(9) A gas generator for an air bag using the squib described in any one of (1) to (8) described above.

(10) A gas generator for a seat belt pretensioner using the squib described in any one of (1) to (8) described above.

Effects of the Invention

According to the invention, as the SCB chip and the capacitor are connected by the use of top electrodes and side electrodes and/or bottom electrodes, the installation of the SCB chip on the capacitor becomes possible. Therefore, the size of the product can be smaller as compared with the case of the SCB chip and the capacitor being arranged in parallel with each other. Also, since the number of connected locations is decreased, the reliability is improved from the standpoint of guarantee of quality. When using solder or conductive paste as connecting means, the connecting processes which have been separately performed by two processes with the prior art can be effected only by one reflow process. Moreover, the present invention makes it possible to use even smaller SCB chip which has been considered to be difficult to use with the prior art.

According to the invention, moreover, even with the case that the capacitor with the SCB chip is mounted, the region of the header on which the SCB chip is mounted is formed with a recess, thereby equalizing the level of the top of the SCB chip with the level of the header around the SCB chip. Therefore, the invention can eliminate irregularity in density of ignition powder which is caused by unevenness of the surface of the substrate when a cup body packed with ignition power is combined with the substrate and which has been noticed as an anxious matter with prior at devices.

DESCRIPTION OF THE REFERENCE NUMERALS

1 Printed circuit board
2 Thick film resistor
3 Electrostatic protection device
4 Electrode pin
5 Thin film resistor
6 Substrate
7 SCB chip
8 Capacitor
9, 9' Electrode pins
10 Header
11 Through-electrode
12 Sealing glass
13 Epoxy resin
14 Top electrode
15 Bottom electrode
16 Side electrode
17 End electrode
18 Solder or Conductive paste
19 Solder or Conductive paste
20 Capacitor electrode
21 Side through-hole electrode
22 Insulating layer
23 Cover electrode
24 Wire bonding
25 Ignition powder
26 Insulating resin
27 Cup body
28 Protective resin cup
31 Gas generator for air bag
32 Squib
33 Enhancer
34 Gas generating agent
35 Filter
36 Outer case
37 Hole
41 Gas generator for seat belt pretensioner (micro gas-generator)
42 Squib
43 Gas generating agent
44 Base (holder)
45 Cup body
110 Central control unit
111a to 111d Air bag modules 114, 115 Electrode pins

BEST MODE FOR CARRYING OUT THE INVENTION

The invention will then be specifically explained.

Figure 2:
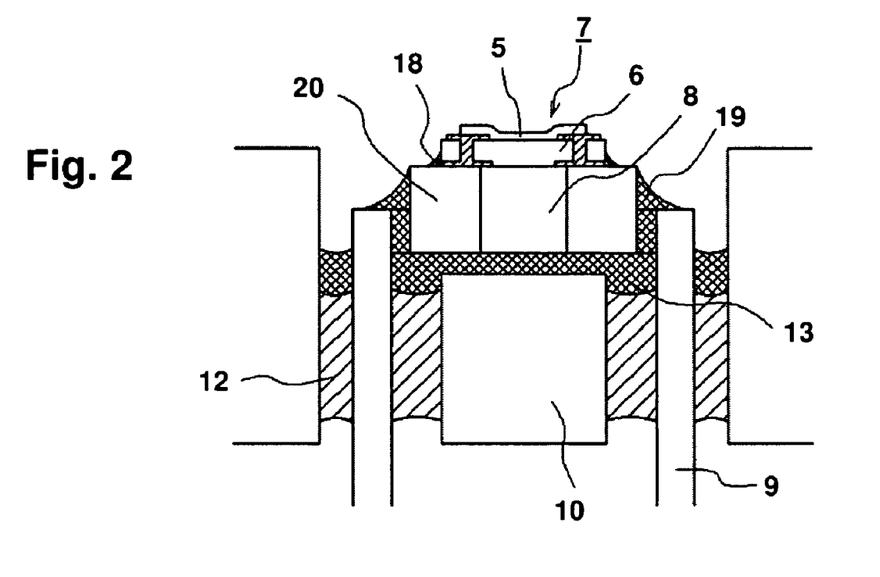
FIG. 2 is a sectional view of a preferable squib according to the invention.
Figure 3A:
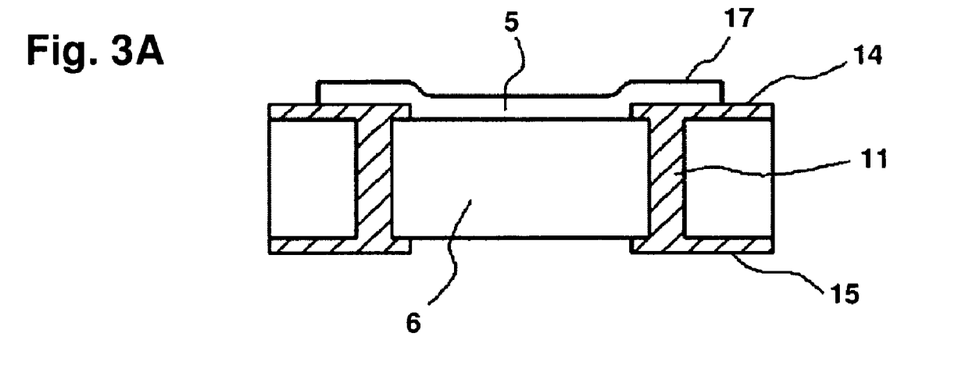
FIG. 3 is a sectional view (a) and a plan view (b) of an SCB chip having through-electrodes.
Figure 3B:
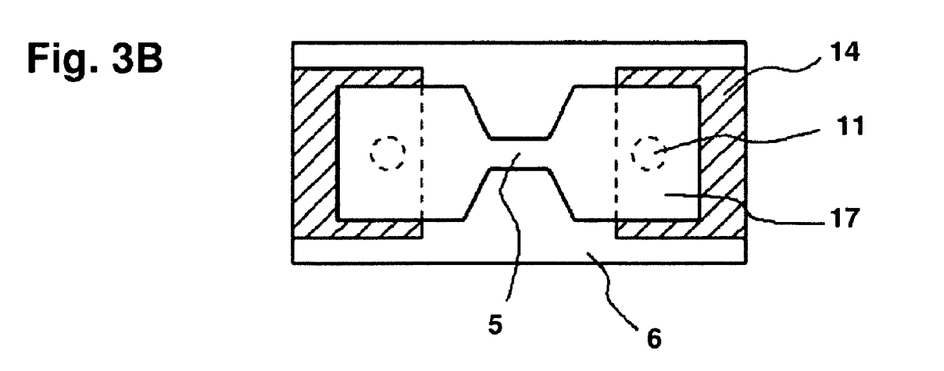

FIGS. 2 and 3 illustrate a preferable squib in section according to the invention, and one example of SCB chip on an enlarged scale, respectively.

In the drawings, reference numeral 5 shows a thin film resistor (SCB), and reference numeral 6 denotes a substrate, the both members forming an SCB chip 7. The drawings illustrate a capacitor 8, electrode pins 9, a header 10, and through-electrodes 11 provided in the SCB chip substrate 6. Moreover, reference numeral 12 shows sealing glass for insulating the electrode pins 9 from each other, and reference numeral 13 demotes epoxy resin as an insulator. Further, there is ignition powder packed on the thin film resistor 5 and covered by a cup body, although they are not shown.

As shown in the drawings, the SCB chip substrate 6 is provided with the through-electrodes 11 passing through the substrate 6 from its upper surface to its bottom surface. The thin film resistor 5 is formed on the SCB chip substrate 6 provided with top electrodes connected to the through-electrodes 11 so that end electrodes 17 of the thin film resistor 5 are electrically connected to the through-electrodes 11 through the top electrodes 14 of the substrate 6.

Further, the SCB chip substrate 6 is directly located on the capacitor 8 so that the SCB chip 7 is electrically connected to the capacitor 8 by connecting bottom electrodes 15 of the SCB chip substrate 6 and electrodes 20 of the capacitor 8 by means of solder or conductive paste 18.

Moreover, the capacitor electrodes 20 and the electrode pins 9 may also be connected by solder or conductive paste 19.

In this way, not only the connection of the capacitor 8 and the electrode pins 9, but also the connection of the thin film resistor 5 and the capacitor 8 can be effected by the same connecting means such as soldering by electrically connecting the top electrodes 14 and the bottom electrodes 15 using the through-electrodes 11 provided in the SCB chip substrate 6. Consequently, the two electrical connections can be performed simultaneously only by one reflow process, without the need to perform two processes as is the case with the prior art.

According to the invention, moreover, as the SCB chip substrate 6 having the through-electrodes 11 is connected to the capacitor 8, it becomes possible to use a smaller SCB chip substrate which has been difficult to use because of a difficulty resulting from the dimension when connecting a circuit board to electrode pins in the state in direct contact with electrode pins by soldering.

In other words, the sizes of circuit boards enabling to be used in the prior art are of the order of at least 3×2 mm. The invention makes it possible to use SCB chip substrates smaller than 1.8×1 mm and hence SCB chips, themselves. In more detail, with the hitherto used circuit boards, since intervals between electrode pins have been determined as 3.1 mm, the circuit boards need to have at least a length corresponding to the intervals in order to connect the electrode pins. With the invention, however, since it needs only have a length required to connect to the end electrodes of the capacitor without need to directly connect the electrode pins and the electrodes of the SCB chip, the SCB chip of 1.8×1 mm described above can be used in the case that the size of the capacitor is 2×1.25 mm.

Another configuration of the invention will then be explained.

Figure 4A:
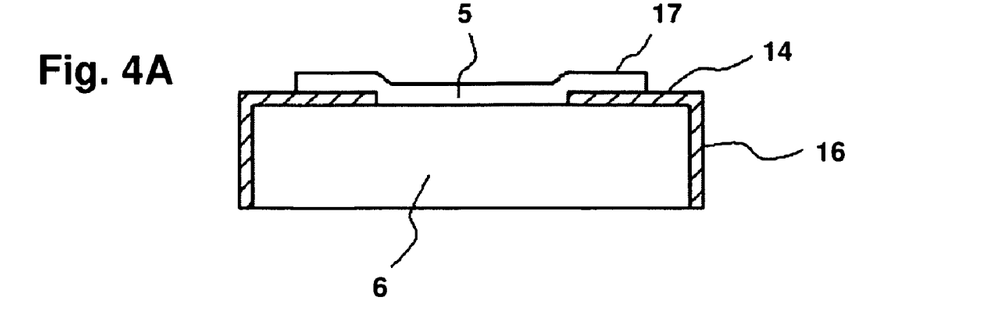
FIG. 4 is a sectional view (a) and a plan view (b) of an SCB chip having side electrodes.
Figure 4B:
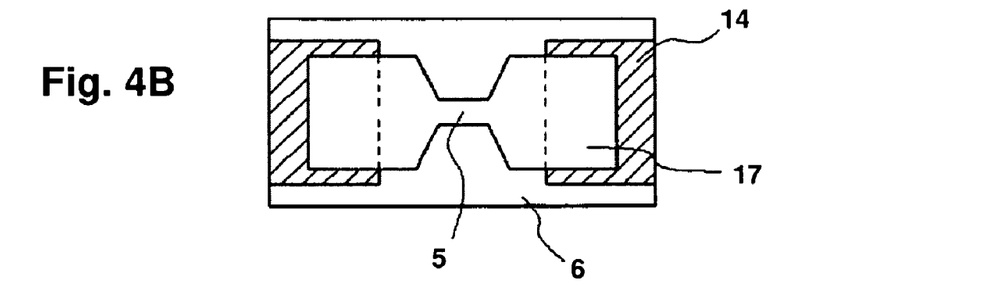

FIG. 4 illustrates an SCB chip substrate 6 provided with top electrodes 14 and side electrodes 16.

The drawing shows a thin film resistor 5, the SCB chip substrate 6, and the side electrodes 16 provided on side surfaces of the SCB chip substrate 6. The side electrodes 16 are connected to the top electrodes 14 so that an SCB chip 7 can be connected to a capacitor 8 by connecting the side electrodes 16 and capacitor electrodes 20, for example, by soldering.

Figure 5A:
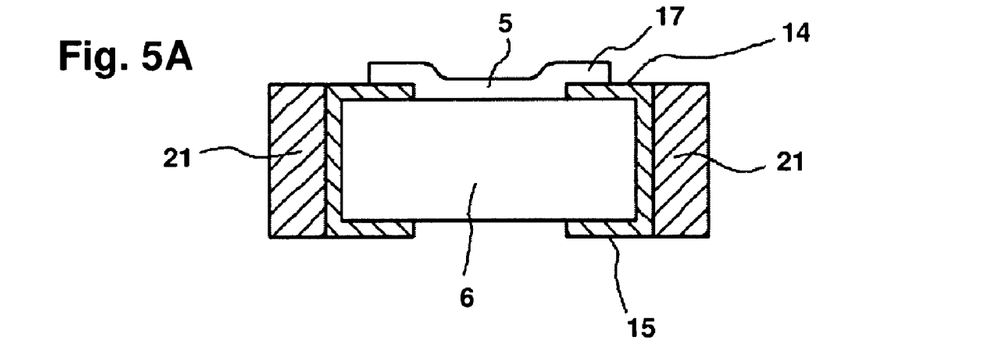
FIG. 5 is a sectional view (a) and a plan view (b) of an SCB chip having side through-hole electrodes as side electrodes.
Figure 5B:
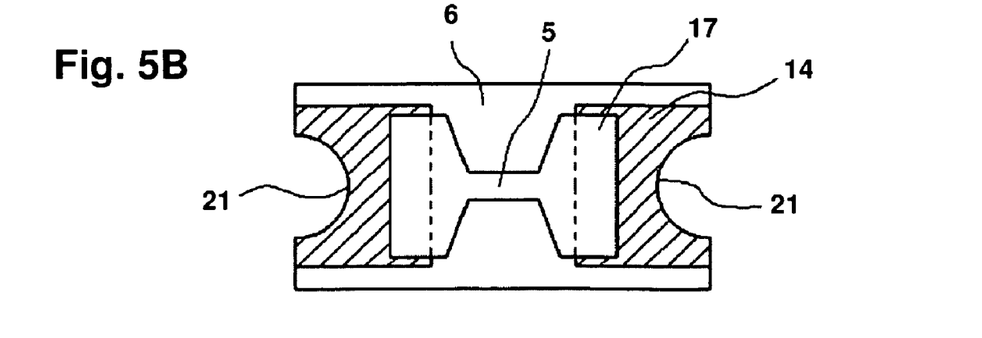

FIG. 5 illustrates a use of side through-hole electrodes as a further example using side electrodes.

The drawings illustrate a thin film resistor 5, an SCB chip substrate 6, and the side through-hole electrodes 21 as one example of side electrodes provided on side faces of the SCB chip. Before forming the thin film resistor 5, a through-hole electrode is formed on the substrate 6 and connected to top electrodes 14 and, if necessary, to bottom electrodes 15 and after forming the thin film resistor 5, the through-hole electrode is cut when dividing into chips in a final step to form the side through-hole electrodes 21 in the form of a semicircle exposed on the side faces of the SCB chip substrate 6. The shape of the side through-hole electrodes 21 is not to be limited to the circle, and may be any other shape by the use of micro-blasting, laser machining, or the like. If using this method, side electrodes can be formed in the simpler manner.

As shown in the drawing, by providing the side through-hole electrodes 21, the end electrodes 17 of the thin film resistor 5 are electrically connected to the bottom electrodes 15 through the top electrodes 14 of the SCB chip substrate 6 and the side through-hole electrodes 21.

Figure 6:
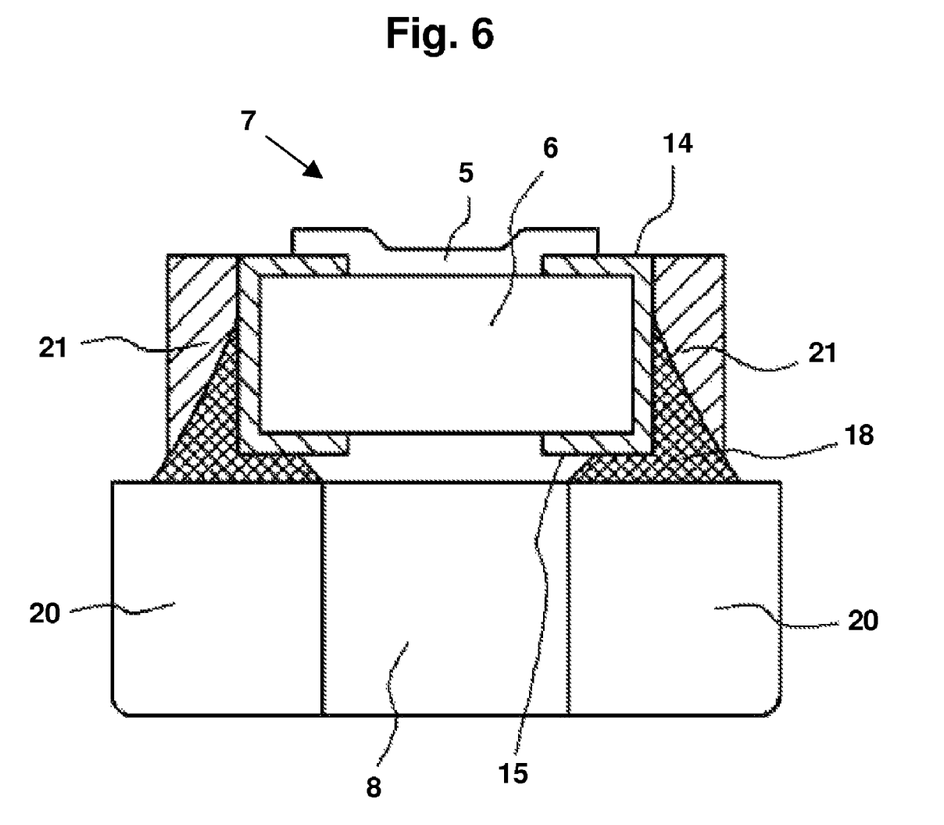
FIG. 6 is a view illustrating a state that soldering is applied not only to side electrodes but also to bottom electrodes.

Moreover, since the SCB chip substrate 6 is directly located on a capacitor 8, the SCB chip 7 and the capacitor 8 are electrically connected by connecting the bottom electrodes 15 of the SCB chip substrate 6 and the side through-hole electrodes 21 to capacitor electrodes 20 by means of solder or conductive paste. In this case, as shown in FIG. 6, the solder or conductive paste 18 is applied not only to the bottom electrodes 15, but also to the side through-hole electrodes 21, thereby achieving the connection to the capacitor electrodes 20. Particularly, the connected state of the side through-hole electrodes 21 by solder or conductive paste can be directly visually ascertained so that it is advantageous to ensure the reliability of connection.

Moreover, the bottom electrodes 15 may be omitted, insofar as the side through-hole electrodes 21 and the capacitor electrodes 20 are connected with great reliability.

Furthermore, the electrodes 20 of the capacitor 8 and the electrode pins 9 can also be connected by solder 19 (refer to FIG. 2).

In this case, the connection by the same connecting means of soldering can be applied not only to the connection of the capacitor 8 and the electrode pins 9 but also to the connection of the SCB chip 7 and the capacitor 8 so that these connections can be effected by only one reflow process without need to perform two processes as is the case with the prior art.

Figure 7A:
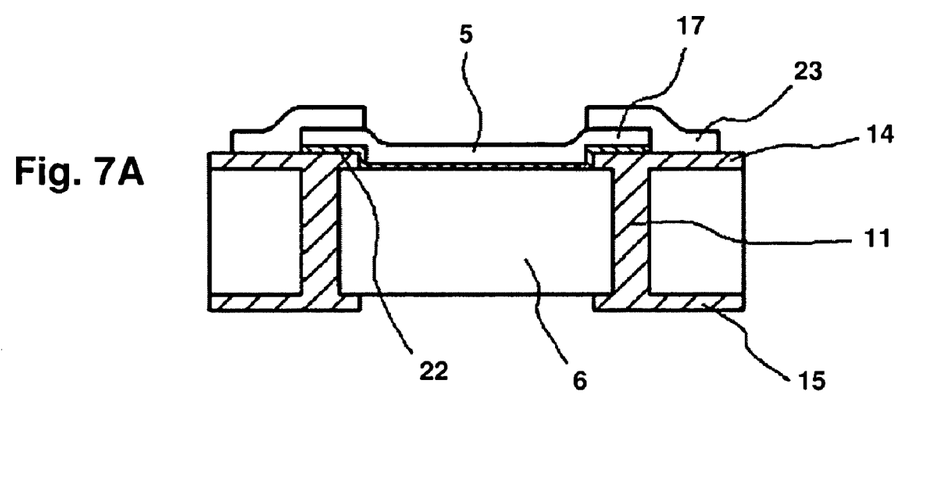
FIG. 7 is a sectional view (a) and a plan view (b) of an SCB chip having cover electrodes.
Figure 7B:
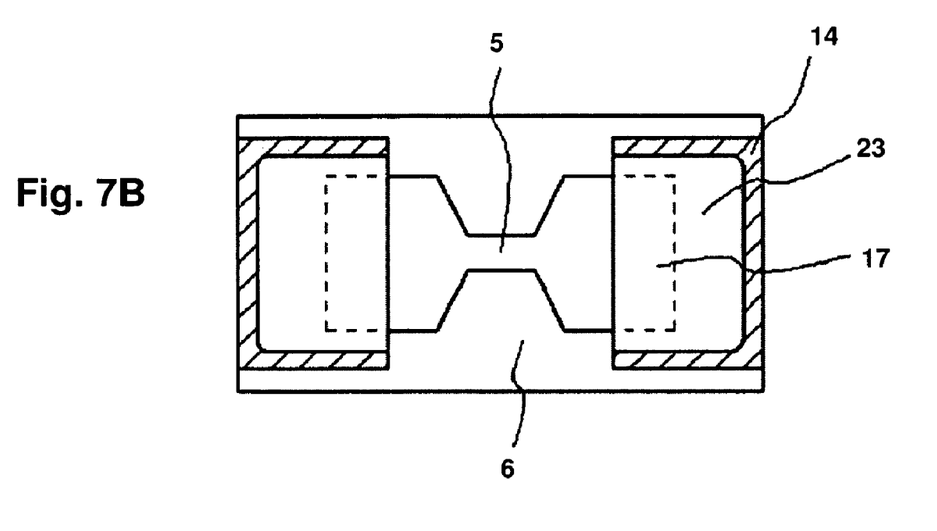

FIG. 7 illustrates one example of the case that a laminated structure including an insulating layer is employed as a thin film resistor 5. In order to connect the top electrodes 14 and the end electrodes 17 of the thin film resistor on an SCB chip, the end electrodes 17 may be superimposed on the top electrodes 14 when the thin film resistor 5 is formed by a single layer. If the thin film resistor 5 is multilayer including an insulating layer or layers therebetween, the electrical continuity between the end electrodes 17 and the top electrodes 14 is ensured by providing cover electrodes 23 at locations covering both the end electrodes 17 and the top electrodes 14.

Regardless whether the thin film resistor is the single layer or multilayer, the cover electrodes may be arranged on the SCB chip in order to provide connection surfaces for connecting the SCB chip and the electrode pins by wire bonding. Moreover, the cover electrodes can be used for both the cases that the top electrodes and the bottom electrodes are connected by the form of through-electrodes and that by the form of side electrodes. In addition, Al, Au, and the like are suitable for materials for such a wire bonding, while Al, Au, Ni, and the like are effectively suitable for materials for the cover electrodes.

Figure 8:
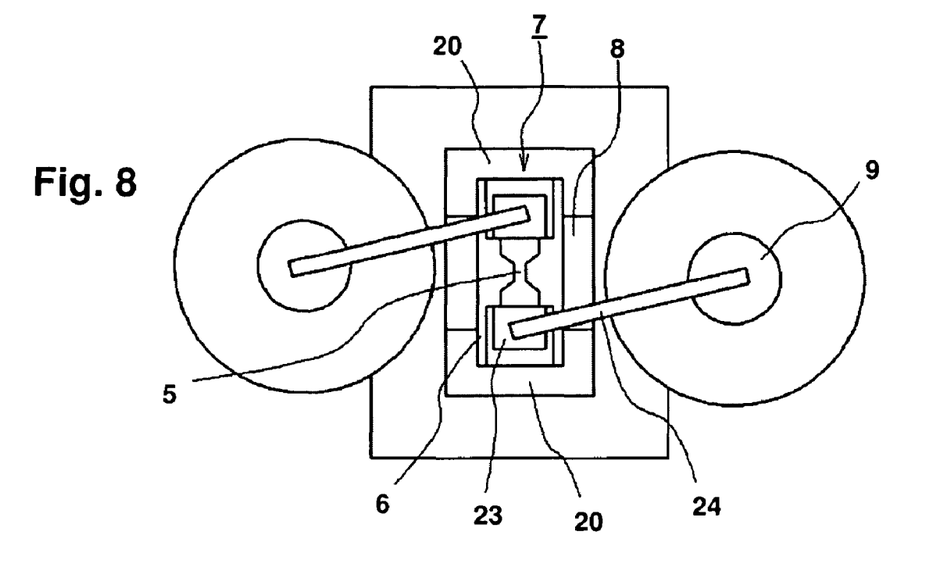
FIG. 8 is a view illustrating an SCB chip connected to electrode pins through wire bonding.

FIG. 8 illustrates one example of the case that the wire bonding 24 is used for connecting the electrode pins 9 and the SCB chip 7. The connection between the SCB chip 7 and the capacitor 8 is as described above.

Although the electrode pins 9 and the SCB chip 7 are connected through the electrodes 20 of the capacitor 8 in the example described above, they are also connected through wire bonding 24 extending from the cover electrode 23 of the SCB chip 7 as described above.

In order to avoid an occurrence of cracks due to thermal shock when soldering, it is required to adjust coefficients of thermal expansion of members to be connected to substantially similar levels. When the wire bonding is used, the adjustment of coefficients of thermal expansion is not required so that the selection of the material of the SCB chip becomes easy. In addition, the mounted position on the header is not limited to between the electrode pins so that the freedom of design of the header increases.

Figure 9:
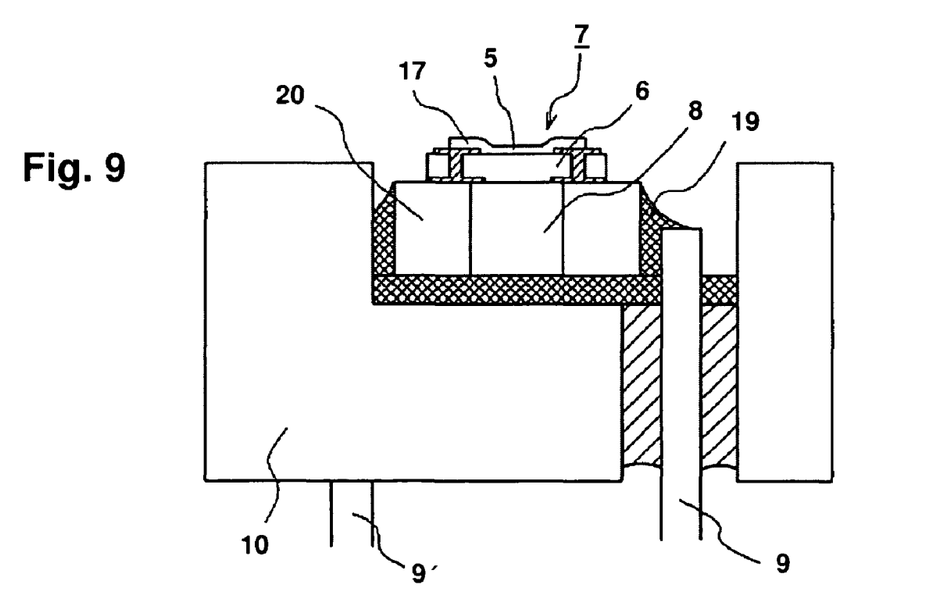
FIG. 9 is a sectional view of the SCB chip and capacitor according to the invention mounted on a header of a structure with one of electrode pins being grounded.

Moreover, FIG. 9 illustrates a further configuration of the invention. In this example, one electrode pin 9' is directly secured to a header metal portion 10, and a header has a high gas-tightness by using glass seal 12 and is insulated from the other electrode pin 9. A capacitor 8 and an SCB chip 7 are mounted on the header, and one of end electrodes 17 of a thin film resistor 5 on the SCB chip is electrically connected to the electrode pin 9, while the other end electrode is electrically connected to the header metal portion 10.

The thin film resistor 5 can be connected to the electrode pins 9 and the header metal portion 10 through the capacitor electrodes 20 by means of solder or conductive paste in the same manner as described above. Or the thin film resistor 5 can also be connected to the electrode pins 9 and the header metal portion 10 through wire bonding 24 (refer to FIG. 8) and the end electrodes 17 of the thin film resistor 5 mounted on the capacitor 8. Further, the connection to the header metal portion 10 can also be effected using solder or conductive paste, while the connection to the electrode pin 9 can be effected using wire bonding 24. At any rate, the connection of said electrode pins 9 and the SCB chip 7 can be effected by whether solder or conductive paste through the capacitor electrodes 20 or wire bonding extending from the chip. At this time, the methods for connecting the electrode pins and the SCB chip, and the combination of the through-electrodes of the SCB chip and the side electrodes can be freely selected.

In this way, by using the structure that the metal portion of the header is connected to one of the electrode pins, it becomes possible to prevent any erroneous ignition or firing with great certainty even when static electricity is applied to the electrode pins and the header metal portion. Even when having two electrode pins, by electrically connecting one electrode pin to the header metal portion or providing a discharge gap between the electrode pins and the header, it is possible to prevent any erroneous ignition or firing even when static electricity is applied to the electrode pins and the header metal portion.

By the way, when the capacitor with the SCB chip is merely mounted on the header, irregular surfaces occur owing to their thicknesses.

In this case, however, the header is formed in its top surface with a recess for receiving the capacitor 8 together with the SCB chip as shown in FIG. 2. The depth of the recess corresponds to at least the thickness of the capacitor, preferably to the thicknesses of both the SCB chip and the capacitor, thereby substantially equalizing the height of the mounted capacitor 8 with the SCB chip with the height of the surface of the header surrounding the capacitor 8. In this way, it is possible to effectively eliminate irregular or uneven surfaces of the header, which have been problems noted with the prior art. Moreover, clearances around the capacitor 8 are packed with a resin so as to eliminate the unevenness of the surface of the header against which ignition powder is pushed, thereby achieving a stable ignition sensitivity.

The material from which to form the substrate of the SCB chip according to the invention may be any one so long as it can be used as printed circuit boards. Preferable are glass substrate, ceramic substrate, LTCC (Low Temperature Co-fired Multilayer Ceramic Substrates), silicon substrate, and the like. The reason for selecting these materials is that a heating resistive element is supplied with electric energy to generate heat, by means of which the explosive or ignition powder is heated to an ignition temperature of about 300° C. so as to be fired so that preferably the substrate is stable until at this ignition temperature.

Moreover, the capacitor preferably used in the present invention is a ceramic capacitor, because the ceramic capacitor is not only small in outer shape but also exhibits a lower internal impedance for wave shapes of static electricity in comparison with those of other capacitors of substantially equal capacities. Owing to the lower internal impedance, even when static electricity is applied between the electrode pins, the electrostatic energy is efficiently absorbed in the capacitor connected in parallel with the SCB chip to enable any erroneous ignition or firing to be prevented.

Such ceramic capacitors preferably have a capacity of 0.1 µF to 10 µF, even more preferably 0.2 µF to 2 µF, and still even more preferably 0.5 µF to 1 µF. If the capacity of the capacitor is too small, the static electricity absorption capacity becomes insufficient. If too large, the electric current for ignition is absorbed in the capacitor to delay the ignition time.

As the ignition powder for use in the present invention, it is preferable to contain zirconium in its composition. Other than this, those containing titanium hydride, boron or lead trinitroresorcinate are advantageously suitable. Moreover, as the ignition powders other than those described above, there are those disclosed in the specification of Japanese Patent Application Laid Open No. 2002-362,992. Ignition powders are not particularly limited for this purpose, and the thin film resistor as a heating resistive element is arranged in contact with such an ignition powder.

In the present invention, further, the upper surface of the SCB chip may be previously coated with an ignition powder composition. In more detail, slurry ignition powder is dispensed onto the upper surface of a thin film resistor and is dried. In comparison with the case of ignition powder simply packed, the coated and dried ignition powder composition contacts the thin film resistor in a stable condition which effectively contributes to a reliable ignition and shortening of ignition time.

Figure 10:
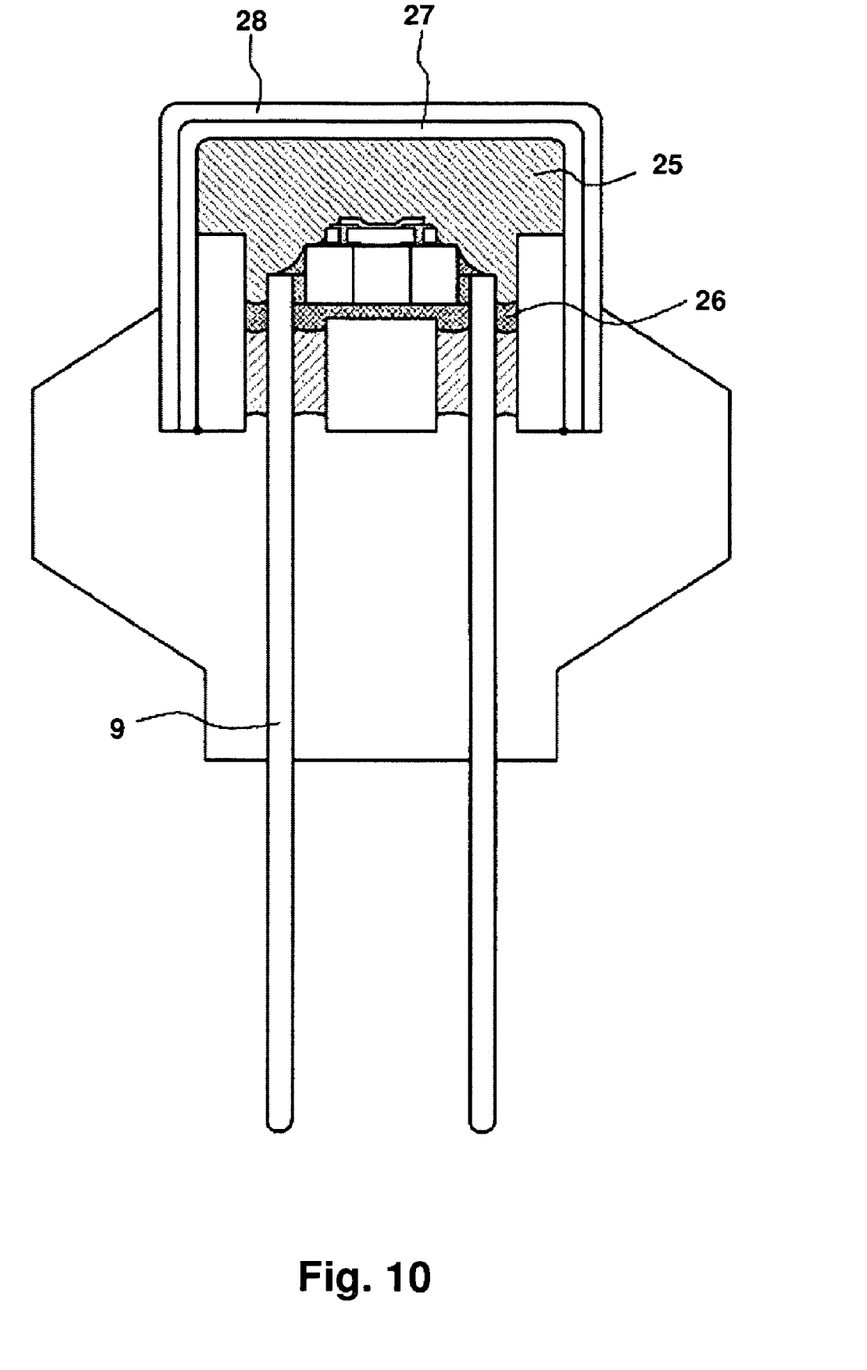
FIG. 10 is an overall view of a squib according to the invention.

For reference, the whole construction of the squib according to the invention is shown in the sectional view of FIG. 10.

FIG. 10 illustrates ignition powder 25, an insulating resin 26 for preventing short circuiting between the header metal portion and capacitor electrodes of a capacitor with an SCB chip, a cup body 27, and a protective resin cup 28.

FIG. 10 illustrates ignition powder 25, a resin 26 filled in gaps around the capacitor having the SCB chip, a cup body 27, and a protective resin cup 28.

A gas generator for an air bag using the ignition device according to the invention will then be explained.

Figure 11:
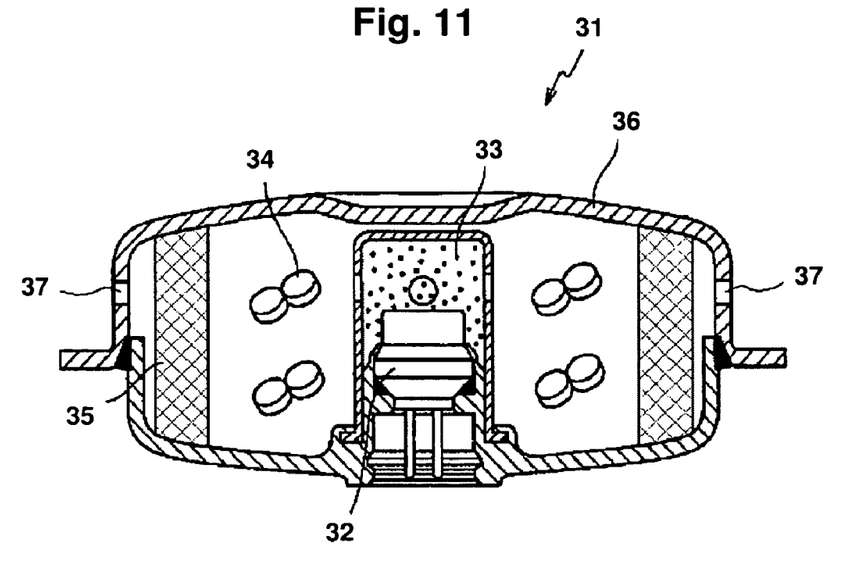
FIG. 11 is a conceptual view of a gas generator for an air bag.

FIG. 11 is a conceptual view of a gas generator for an air bag. As shown in FIG. 11, the gas generator 31 for the air bag comprises therein a squib 32, an enhancer 33, gas generating agent 34, and filters 35, and outside the generator an outer case 36 withstanding the pressure when the gas generating agent 34 is burned. The outer case 36 is formed with holes 37 for discharging the generated gas into the air bag.

When the squib 32 is actuated, the enhancer 33 burns by heat energy produced from the squib 32 to generate flame and thermal particles by means of which the gas generating agent 34 is burned to generate a gas for inflating the air bag. The generated gas is discharged out of the outer case 36 through the holes 37 formed in the outer case 36. At this time, the gas passes through the filters 35 so that residues of the burned gas generating agent are collected at the filters, and the gas itself is cooled simultaneously.

Moreover, a gas generator for a seat belt pretensioner using the ignition device according to the invention will be explained.

Figure 12:
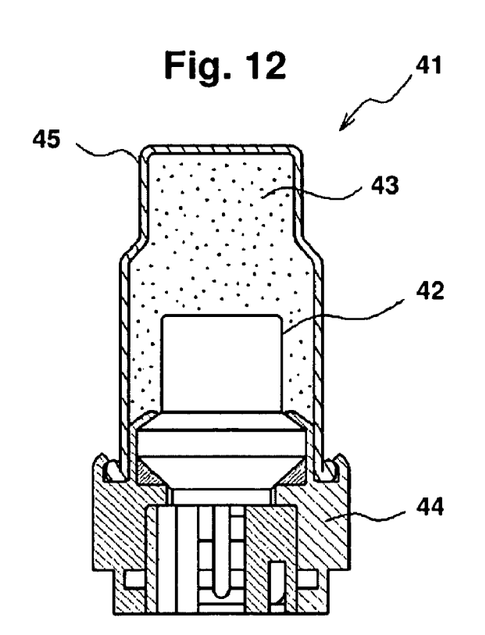
FIG. 12 is a conceptual view of a gas generator for a seat belt pretensioner.

FIG. 12 is a conceptual view illustrating the gas generator (micro gas-generator) for a seat belt pretensioner. As shown in FIG. 12, the micro gas-generation 41 comprises therein a squib 42 and a gas generating agent 43. The squib 42 is fixed to a base 44 called a holder. Further, a cup body 45 for storing a gas generating agent 43 therein is also fixed to the holder by means of, for example, crimping. When the squib 42 is actuated, the gas generating agent 43 in the cup body 45 is burned by the flame and the thermal particles coming from the squib 42 to generate a gas.

The control procedure by the central control unit will then be explained.

Figure 13:
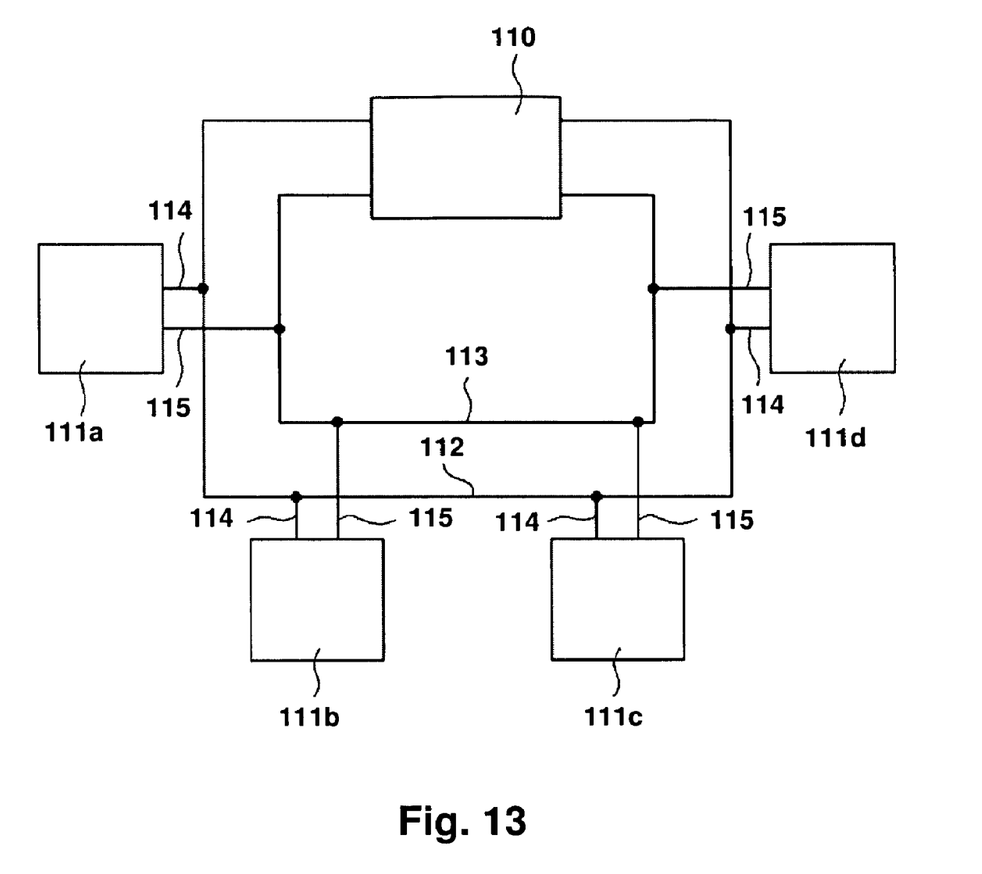
FIG. 13 is an explanatory view of a central control unit.

FIG. 13 illustrates an example of the air bag system linked to a local area network (LAN) and connected to the central control unit 110 and four air bag modules 111a, 111b, 111c and 111d. The two air bag modules 111b and 111c each may have a gas generator for inflating, for example, a front air bag, while the other two air bag modules 111a and 111d each may have a gas generator for inflating, for example, a side air bag.

The ignition device is put in the gas generator included in each of these modules. Each of the ignition devices has two electrode pins 114 and 115, the former electrode pin 114 being connected to a first electric-supply conductor 112 connected to the central control unit 110, and the latter electrode pin 115 being connected to a second electric-supply conductor 113 connected to the central control unit 110.

Under a normal condition, that is, when a car does not encounter a particular accident requiring activation of one or more air bag modules 111a, 111b, 111c and 111d, the central control unit 110 periodically gives the electric-supply conductors 112 and 113 low electric current which is fed through the electrode pins 114 and 115 to the electric energy storing means (capacitors) of the ignition devices included in the four air bag modules 111a, 111b, 111c and 111d, respectively.

In the event that for example, upon impact, the activation of, for example, the air bag module 111c is desired, the central control unit 110 feeds a particular electric pulse string constituting an ignition command for the ignition device of the air bag module 111c to the first electric-supply conductor 112. Although the particular electric pulse string is fed to each of the ignition devices through the electrode pins 114 and 115, only the intercommunication means included in the ignition device of the air bag module 111c responds to the command to activate the electric energy-storing means associated with the ignition switching means, thereby activating the ignition powder in the manner described above.

Following the impact, if it is desired to activate some air bag modules, for example, the air bag modules 111a and 111b, the central control unit 110 gives the first electric-supply conductor 112 a particular electric pulse string for each of the ignition devices included in the air bag modules 111a and 111b, respectively. The two ignition devices operate in the same manner as described above.

What is claimed is:

1. A squib including:
   (a) a cup body and a header for holding a plurality of electrode pins insulated from one another and closing the opening of said cup body;
   (b) ignition powder and a semiconductor bridge (SCB) chip in said cup body connected to said electrode pins for igniting said ignition powder by externally applying electric current;
   (c) said SCB chip comprising:
      (i) a substrate and a thin film resistor formed on an upper surface of said substrate,
      (ii) a capacitor electrically connected to said electrode pins in parallel with the thin film resistor of said SCB chip,
      (iii) an SCB top electrode on a top surface of said SCB, an SCB side electrode on a side surface of said SCB, and optionally an SCB bottom electrode on a bottom surface of said SCB;
   (d) said capacitor being arranged above said header, and having capacitor electrodes at opposite ends of the capacitor;
   (e) said SCB chip being
      (i) directly mounted on said capacitor so that the capacitor electrodes at opposite ends of the capacitor contact SCB electrodes; and
      (ii) smaller than the capacitor; and
   (f) the top, side and optional bottom SCB electrodes and the capacitor electrodes being electrically connected with each other by solder or conductive paste, whereby
      (i) the SCB chip is electrically connected with the capacitor electrodes; and
      (ii) the thin film resistor of the SCB chip and the capacitor are in parallel electrical connection with said plurality of electrode pins without electrical connection to the substrate.

2. The squib as claimed in claim 1, characterized in that: said side electrodes are side through-hole electrodes.

3. The squib as claimed in claim 1, characterized in that: said top electrodes and said bottom electrodes are connected by through-electrodes provided in said substrate.

4. The squib as claimed in claim 3, characterized in that: said SCB chip and said electrode pins are electrically connected through capacitor electrodes connected to said SCB chip and indirectly through solder or conductive paste.

5. The squib as claimed in claim 4 characterized in that: said SCB chip and said electrode pins are electrically connected directly through wire bonding connected to end electrodes of said thin film resistor.

6. The squib as claimed in claim 5, characterized in that: said header is formed with a recess of a depth corresponding to the thickness of said capacitor with said SCB chip at a region of said header onto which said capacitor with said SCB chip is mounted so that the height of said SCB chip is equalized with the height of the header around said capacitor with said SCB chip except for the region on which said capacitor with said SCB chip is mounted.

7. A gas generator for an air bag using the squib claimed in claim 6.

8. A gas generator for a seat belt pretensioner using the squib claimed in claim 6.

9. The squib as claimed in claim 1, characterized in that:
said SCB chip and said electrode pins are electrically connected through capacitor electrodes connected to said SCB chip and indirectly through solder or conductive paste.

10. The squib as claimed in claim 1, characterized in that:
said SCB chip and said electrode pins are electrically connected directly through wire bonding connected to end electrodes of said thin film resistor.

11. The squib as claimed in claim 1, characterized in that:
said header is formed with a recess of a depth corresponding to the thickness of said capacitor with said SCB chip at a region of said header onto which said capacitor with said SCB chip is mounted so that
the height of said SCB chip is equalized with the height of the header around said capacitor with said SCB chip except for the region on which said capacitor with said SCB chip is mounted.

12. A gas generator for an air bag using the squib claimed in claim 1.

13. A gas generator for a seat belt pretensioner using the squib claimed in claim 1.

14. The squib as claimed in claim 1, wherein said SCB chip has a top electrode, a side electrode and a bottom electrode provided on top, side and bottom surfaces thereof, respectively.

15. A squib including a cup body and a header for holding a plurality of electrode pins insulated from one another and closing the opening of said cup body, and further including, in said cup body:
 (a) ignition powder and an SCB chip connected to said electrode pins for igniting said ignition powder by externally applying electric current;
 (b) said SCB chip consisting of a substrate and a thin film resistor formed on an upper surface of said SCB:
 (c) a capacitor electrically connected to said electrode pins in parallel with the thin film resistor of said SCB chip, said capacitor characterized in that:
  (i) said capacitor is arranged above said header;
  (ii) said SCB chip is directly mounted on said capacitor so that the thin film resistor on said SCB chip and said capacitor are electrically connected through electrodes provided on the substrate of said SCB chip;
  (iii) the size of said SCB chip is smaller than that of the capacitor, and further characterized in that:
 (d) said electrode pins are electrically connected directly through wire bonding connected to end electrodes of said thin film resistor; and
 (e) said header being formed with a recess of a depth corresponding to the thickness of said capacitor with said SCB chip at a region of said header onto which said capacitor with said SCB chip is mounted so that the height of said SCB chip is equalized with the height of the header around said capacitor with said SCB chip except for the region on which said capacitor with said SCB chip is mounted.

* * * * *